United States Patent [19]

Gantzer

[11] Patent Number: 4,922,699
[45] Date of Patent: May 8, 1990

[54] FARM MACHINES WITH A JOINTED TOOLHOLDING FRAME

[75] Inventor: Jean-Paul Gantzer, Lutzelbourg, France

[73] Assignee: Kuhn, s.a., Saverne, France

[21] Appl. No.: 351,844

[22] Filed: May 15, 1989

[30] Foreign Application Priority Data

May 13, 1988 [FR] France .................. 88 06619

[51] Int. Cl.⁵ .......................................... A01D 7/00
[52] U.S. Cl. ........................................ 56/367; 56/370
[58] Field of Search ............... 56/365, 366, 367, 370, 56/379, 380, 384, 396

[56] References Cited

U.S. PATENT DOCUMENTS

| 3,135,079 | 6/1964 | Dunn | 56/6 |
| 3,522,860 | 8/1970 | Purrer | 180/14 |
| 3,910,019 | 11/1975 | Schlittler | 56/367 |
| 4,026,093 | 5/1977 | Knusting et al. | 56/370 |
| 4,151,703 | 5/1979 | Gerlinger | 56/370 |
| 4,166,352 | 9/1979 | Knusting | 56/366 |
| 4,366,666 | 1/1983 | van der Lely et al. | 56/370 |

FOREIGN PATENT DOCUMENTS

| 2844235 | 4/1980 | Fed. Rep. of Germany | 56/370 |
| 8625852 | 9/1986 | Fed. Rep. of Germany | |
| 8715674 | 11/1987 | Fed. Rep. of Germany | |
| 1376142 | 11/1963 | France | |
| 1528431 | 6/1967 | France | |
| 1574280 | 7/1968 | France | |
| 2232980 | 6/1974 | France | |
| 2332697 | 5/1976 | France | |
| 2375814 | 12/1977 | France | |
| 2438414 | 10/1979 | France | |

Primary Examiner—Stephen J. Novosad
Assistant Examiner—Terry Lee Melius
Attorney, Agent, or Firm—Oblon, Spivak, McClelland, Maier & Neustadt

[57] ABSTRACT

This invention relates to a farm machine with a toolholding frame including a crosswise support provided with at least two rotors which is jointed to a coupling device by way of a pin.

The crosswise support is made up of a central part and two lateral parts jointed to the ends of the central part by way of substantially horizontal pins.

Each of these lateral parts is provided with a coupling device having three hooking points for connection to a rotor.

17 Claims, 4 Drawing Sheets

FARM MACHINES WITH A JOINTED TOOLHOLDING FRAME

BACKGROUND OF THE INVENTION

1. Field of the Invention

This invention relates to a farm machine with a toolholding frame comprising particularly a crosswise support and a coupling device which are jointed together by means of a substantially vertical pin, the crosswise support carries at least two rotors located behind it and which are driven in rotation to move the hay lying on the ground, the crosswise support being able to be pivoted around the hinge pin and can be stopped in different positions relative to the direction of advance.

These different positions of the crosswise support make it possible to perform several types of work. Thus, in a first position of the crosswise support, the two rotors can work together to form a single side windrow. In a second position of the crosswise support, each rotor can work independently of the other and, for example, can make its own windrow.

2. Discussion of the Background

In a known device of this type, the crosswise support can be equipped only with rotors specially designed to be connected to the support. In addition, the diameter of these rotors should be relatively small so that the unit does not exceed the width allowed for movement on roads. Because of these constraints, this device has not had great success.

SUMMARY OF THE INVENTION

This invention aims at eliminating the drawbacks of the known device. Accordingly, one object of this invention is to provide a novel toolholding frame with adjustable width and which is able to receive rotors without requiring special arrangements on the latter to assure their fastening to the frame.

For this purpose, an important characteristic of the invention consists in the crosswise support being made up of a central part which is connected to the coupling device and two lateral parts which are jointed to the ends of the central part by means of approximately horizontal pins, each of these lateral parts being provided with a coupling device with three hooking points for the rotors.

The arrangement according to the invention makes it possible to lift the two lateral parts of the crosswise support with the rotors practically vertically. In this way, the width of the unit can be reduced considerably for movements on the roads. This allows the use of rotors with a large diameter to be able to achieve great work widths.

The fact of equipping the lateral parts of the crosswise support with three-point coupling devices makes it possible to hook the rotors with their coupling means currently used for hitching them directly to tractors. Since it is not necessary to make means specific for coupling the rotors, the cost of the unit can be lowered.

It is even possible to envisage the user equipping the support frame with one or more existing rotors. Thus, it is possible to obtain at lower cost a unit with a great work width. It is also possible to equip the crosswise support of the frame with different rotors to be able to perform different types of work. For example, it is possible to use one set of rotors to perform windrowing and one or more other sets of rotors for tedding.

On the other hand, the coupling devices with three hooking points placed in the shape of a triangle make it possible, without any intervention, to hold the rotors both in a horizontal position for work and in a vertical position for transport. Passage from one to the other therefore can be performed instantaneously According to another object of the invention, the central part of the crosswise support comprises one or more small wheels which move over the ground during work. This characteristic enables the entire device and in particular the rotors to follow uneven ground better.

The toolholding frame advantageously comprises a double-action cylinder between the coupling device intended to be connected to the tractor and the crosswise support. This arrangement makes it easily possible to move the crosswise support around the hinge pin which connects it to the coupling device.

The crosswise support comprises hydraulic cylinders between its central part and each of its lateral parts. These cylinders make it possible to move the lateral parts with the rotors around their pins for jointing with the central part and for putting the unit in a work position or in a transport position.

Each rotor comprises a double-action hydraulic cylinder between its central pin which carries the cam for controlling the toolholding arms and support wheels, and its bracket which enables it to be connected to the crosswise support of the toolholding frame. These cylinders make it possible to modify the position of the control cam and the wheels as a function of the work position of the crosswise support.

The cylinders provided on the rotors and the cylinder between the coupling device and the crosswise support are advantageously operated simultaneously. Thus an immediate, error-free adjustment of the crosswise support and rotors is obtained as a function of the work operation selected.

According to another object of the invention, each lateral part of the crosswise support comprises a transmission housing exhibiting a drive shaft connected to a rotor and an input shaft which is connected by means of a transmission shaft to an output shaft of a distribution housing integral with the central part of the crosswise support.

Each of the transmission shafts is made in two parts connected together by a positive clutch consisting of tips provided with three teeth which mesh in the work position and whose teeth have v-shaped vertices. These teeth are advantageously located under the hinge pin between the central part and the corresponding lateral part of the crosswise support.

This arrangement enables the outside part of each transmission shaft to move with the lateral part of the crosswise support from the work position into the transport position and vice versa. In the transport position, the teeth of the two tips provided on these transmission shafts no longer mesh. Upon return to the work position, these teeth are automatically put in place to mesh, due to their V-shaped ends. Actually, when the inclined faces of the teeth of the two tips come in contact, the axial pressure automatically causes a rotation of the tips and corresponding transmission shafts so that meshing can be performed.

According to another object of the invention, the distribution housing of the central part of the crosswise support comprises an input shaft which is directed forward and to which there is connected, by a double universal joint, a transmission shaft in two parts, one of which slides, these two parts being guided in a bearing integral with the coupling device. The double universal joint comprises a crosswise plane of symmetry which is offset toward the rear in the direction of the distribution housing relative to the geometric axis of the hinge pin between the crosswise support and the coupling device when the input shaft of the distribution housing and the transmission shaft are aligned. This arrangement makes it possible to obtain a homokinetic transmission of the movement through the double universal joint in each of the work positions of the crosswise support.

The farm machine with a toolholding frame of the present invention comprises, a crosswise support and a coupling device which are pivotally connected by means of a substantially vertical hinge pin. The crosswise support having means for carrying at least two rotors, with said rotors being located behind the crosswise support and being rotationally driven to move hay lying on the ground. The crosswise support also includes first means for both pivoting the crosswise support around the substantially vertical hinge pin and stopping the crosswise support in several positions in which different angles are formed relative to the direction of advance. The crosswise support comprises a central part which is connected to the coupling device and two lateral parts which are pivotally connected to the ends of the central part by means of substantially horizontal hinge pins. Each lateral part being provided with a further coupling device with each of said further coupling devices having three hooking points for connection to said at least two rotors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
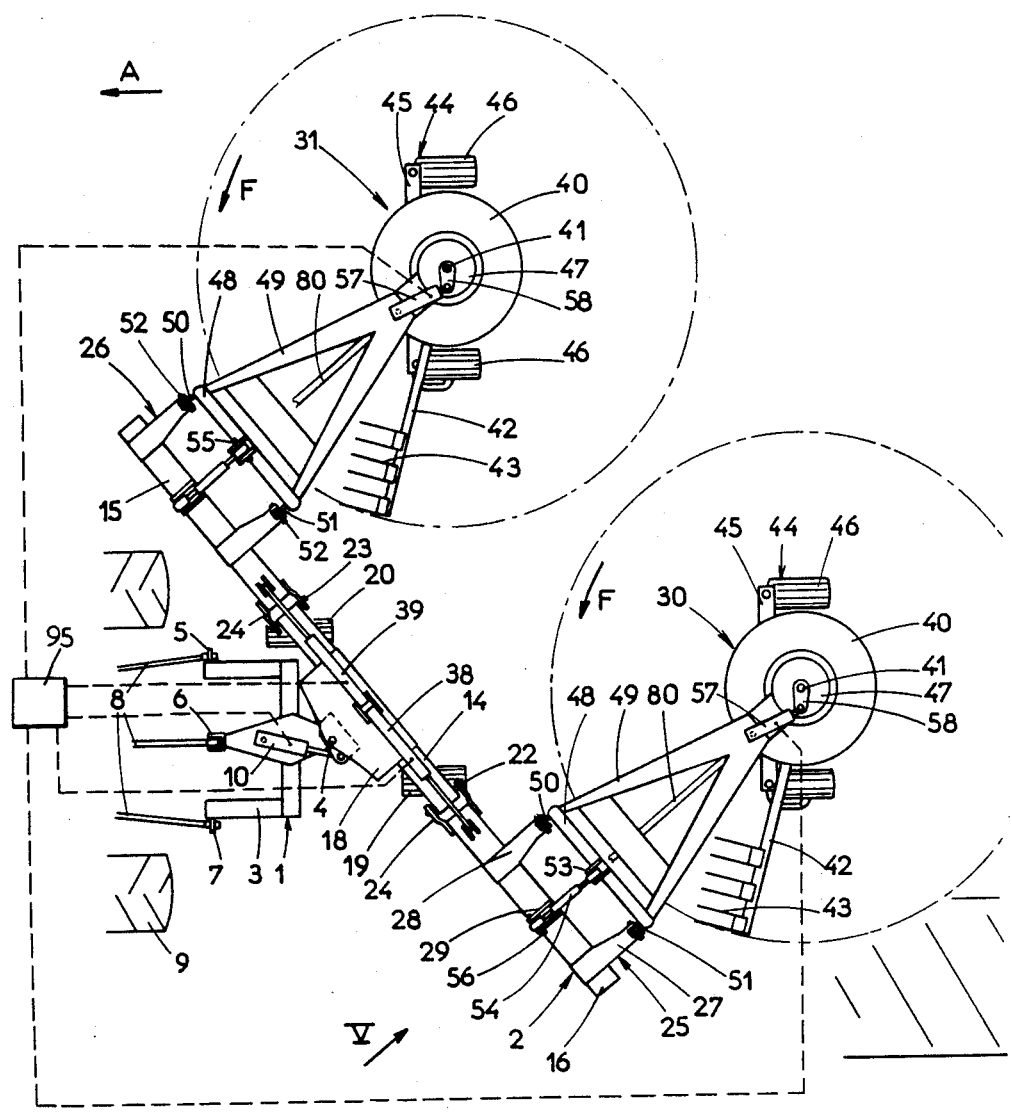
FIG. 1 is a top view of the device according to the invention in a first work position.

As represented in the accompanying figures, the machine according to the invention has a toolholding frame (1) comprising a crosswise support (2) and a coupling device (3). These two elements are connected to one another by means of a substantially vertical hinge pin (4). Coupling device (3) comprises on the side opposite hinge pin (4) three coupling points (5, 6 and 7) for fastening to connecting rods (8) of the hydraulic lifting device of a driving tractor (9). Between this coupling device (3) and crosswise support (2) there is provided a double-action hydraulic cylinder (10). As shown particularly in FIG. 4, this cylinder is jointed to a pin (11) fastened to coupling device (3) and a pin (12) integral with a lug (13) connected to crosswise support (2). This cylinder (10) is connected to the hydraulic circuit (95) of tractor (9) and is operated by it. It makes it possible to move the support (2) around hinge pin (4).

Crosswise support (2) is made up of three parts (14, 15, 16) aligned and having substantially the same length. They consist of tubes (17) with a square section (see FIGS. 4 and 6). Central part (14) comprises lugs (18) forming a yoke carrying hinge pin (4) (see FIG. 4). It is also provided with two pivoting wheels (19, 20) which move over the ground during work. These wheels (19, 20) are connected to columns (21) which are substantially vertical and integral with central part (14) (see FIG. 5). The latter also has at each of its ends a substantially horizontal hinge pin (22, 23). Each lateral part (15, 16) comprises, at its end directed toward central part (14), two lugs (24) by means of which it is jointed to a corresponding pin.

Further, each lateral part (15, 16) comprises a coupling device (25, 26) each having three hooking points (27, 28, 29) for a rotor (30, 31). These hooking points (27 to 29) of each device (25, 26) are placed in the shape of a triangle. The two hooking points (27 and 28), separated by the greatest distance, are directed downward while median point (29) is directed upward (see FIG. 5). Each of these hooking points (27 to 29) consists of a yoke (32) integral with an arm (33) itself integral with a bracket (34) fastened to tube (17) of corresponding lateral part (15 or 16) (see FIG. 5). As shown particularly from FIG. 6, this fastening is achieved by means of a second bracket (35) placed on the other side of tube (17). These two brackets (34 and 35) completely surround said tube (17) and are immobilized on the latter by means of clamping bolts (36). For this purpose, each bracket (34, 35) comprises parallel edges (37) provided with orifices for passage of said bolts. This mode of fastening by clamping makes it easily possible to modify the position of hooking points (27 to 29) on tube (17) as a function of the user's needs.

Crosswise support (2) also comprises two hydraulic cylinders (38 and 39). Cylinder (38) is jointed to central part (14) and to lateral part (16) while the other cylinder (39) is jointed to the same central part (14) and the other lateral part (15). These cylinders (38, 39) can be single- or double-acting. They are operated from the hydraulic circuit (95) of tractor (9) and make it possible to move the two lateral parts (15, 16) simultaneously around hinge pins (22 and 23).

Figure 2:
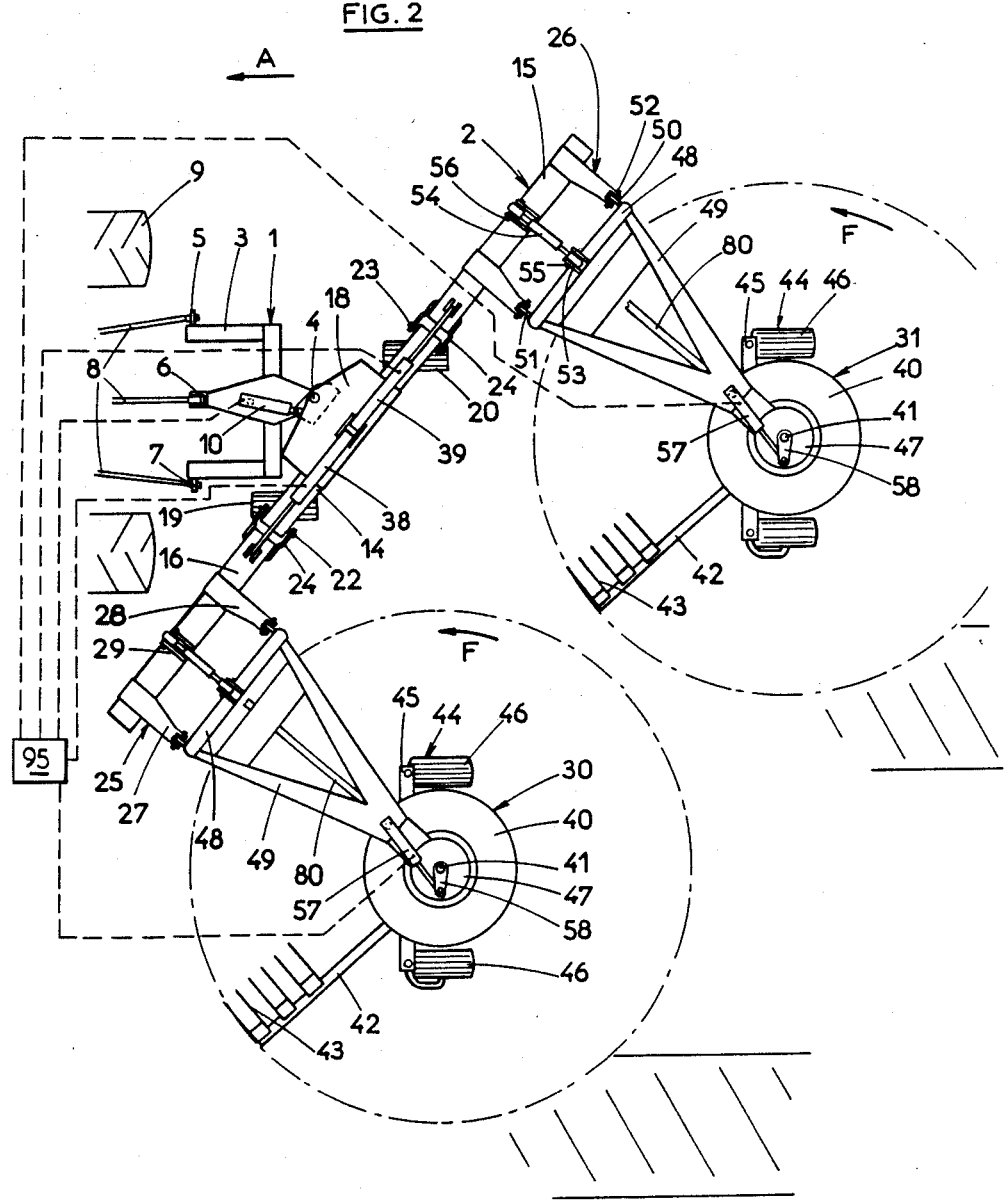
FIG. 2 is a top view of the same device in a second work position.
Figure 3:
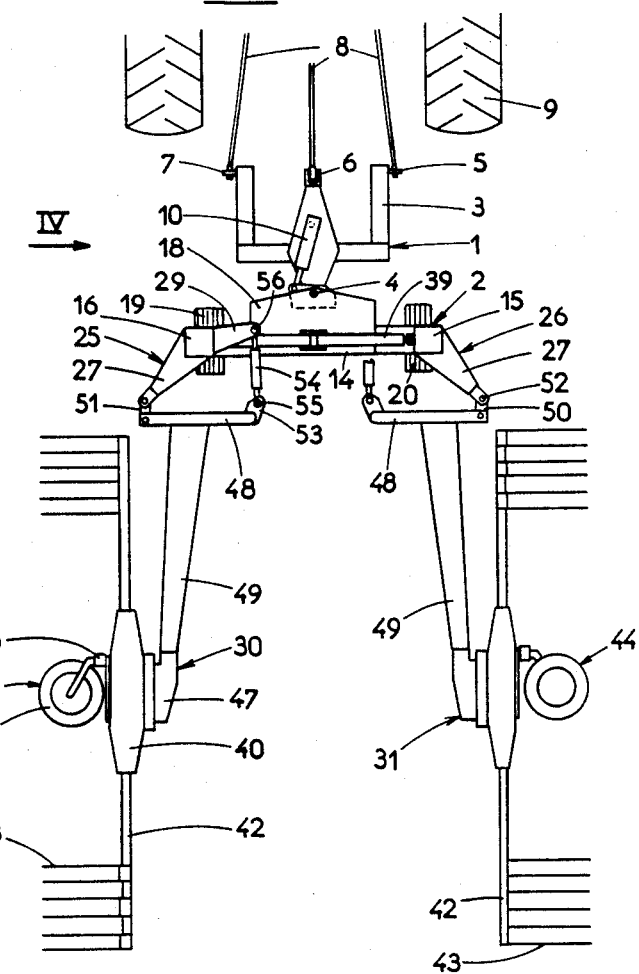
FIG. 3 is a top view of the device in the transport position.

In the example represented in FIGS. 1 to 3, rotors (30, 31) are intended to make windrows. Each of these rotors (30, 31) consists of a hub (40) mounted to rotate on a central support pin (41) which is substantially vertical. The hub (40) carries several toolholding arms (42) directed outward (in FIGS. 1 and 2 only one of these arms is represented) and carrying raking forks (43). At their inside ends, these arms (42) comprise rollers which are located in a control cam integral with central pin (41). This pin (41) also carries at its lower end a wheel train (44) made up of a cross member (45) provided with two pivoting wheels (46). These wheels (46) move over the ground during work. Above hub (40), pin (41) is mounted to be able to turn on itself, but immobile in the direction of its length, in a support (47) in the shape of a housing. This support (47) is connected to coupling bracket (48) by a bracket (49) formed by two diverging arms. The coupling bracket comprises in its lower part two lugs (50 and 51) for coupling to two hooking points (27 and 28) provided on lateral part (15 or 16) of support (2) by pins (52). In addition, bracket (48) comprises at its upper part two lugs (53) between which a connecting rod (54) is fastened by a pin (55). The other end of this connecting rod (54) is fastened to hooking point (29) of lateral part (15 or 16) of support (2) by means of a pin (56). The length of brackets (49) is at least equal to the radius of the path of forks (43) so that rotors (30 and 31) are located completely behind crosswise support (2). This makes it possible to have the center of gravity of the unit close to the ground to obtain a good stability.

Each rotor (30, 31) also comprises a double-action hydraulic cylinder (57). This cylinder (57) is jointed to bracket (49) and a horizontal lug (58) integral with the upper end of central pin (41). This cylinder (57) makes it possible to cause said pin (41) to turn on itself together with the control cam and wheel train (44) to modify their positioning. Cylinder (57) is operated from the hydraulic circuit (95) of tractor (9).

These cylinders (57) which position pins (41) of rotors (30 and 31) and cylinder (10) which positions crosswise support (2) are fed from the same distributor. They are thus operated simultaneously so that the positionings of pins (41) and support (2) are correct in all positions.

Figure 4:
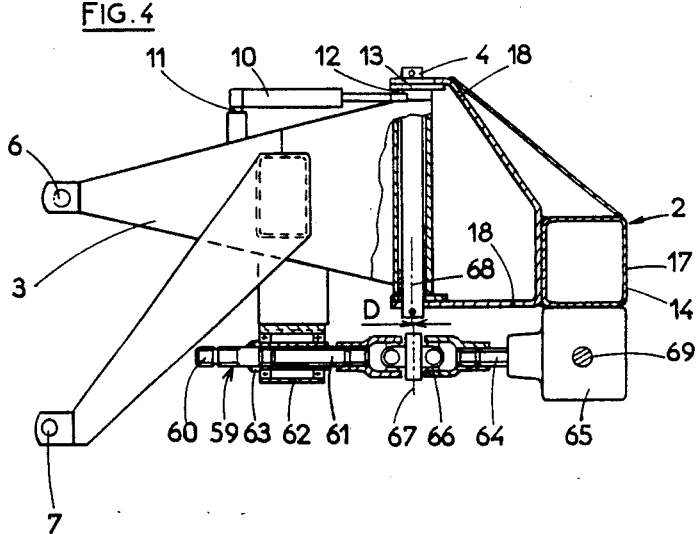
FIG. 4 is a side view, on a larger scale and in partial section, along arrow IV of FIG. 3.

During work, hubs (40) of rotors (30 and 31) are driven in rotation around pins (41) in the direction indicated by arrows (F). Forks (43) then move on circular paths. Further, they are controlled by the cam, by their arms (42) and the rollers which move in said cam, so that over a part of their path they lift and deposit the raked hay to form a windrow. This driving of rotors (30 and 31) is performed from the power takeoff shaft of tractor (9). For this purpose, on the machine there is provided a transmission shaft (59) to which is fitted, in a way known in the art, a shaft with universal joints connected to the power takeoff shaft (see FIG. 4). This transmission shaft (59) is made in two parts (60, 61) as shown in FIG. 4. They are guided in a bearing (62) integral with coupling device (3). Front part (60) comprises a tube (63) internally fluted, and in which rear part (61) can slide. The latter is connected to an input shaft (64) of a distribution housing (65) integral with central part (14) of crosswise support (2). The connection is assured by means of a double universal joint (66) located under hinge pin (4). This joint (66) comprises a crosswise plane of symmetry (67). When transmission shaft (59) and input shaft (64) are aligned, plane of symmetry (67) is offset by value (D) toward the rear, in the direction of distribution housing (65) relative to geometric axis (68) of hinge pin (4).

In distribution housing (65) are housed bevel pinions which transmit the driving movement from input shaft (64) to transmission shafts (69). The latter are two in number and extend out of housing (65) in the direction of each lateral part (15 and 16) of crosswise support (2). These transmission shafts (69) extend into transmission housings (70) provided on each of said lateral parts (see FIG. 5). Each housing (70) is fastened to a strap (71) welded to corresponding lateral part (15 or 16).

Figure 5:
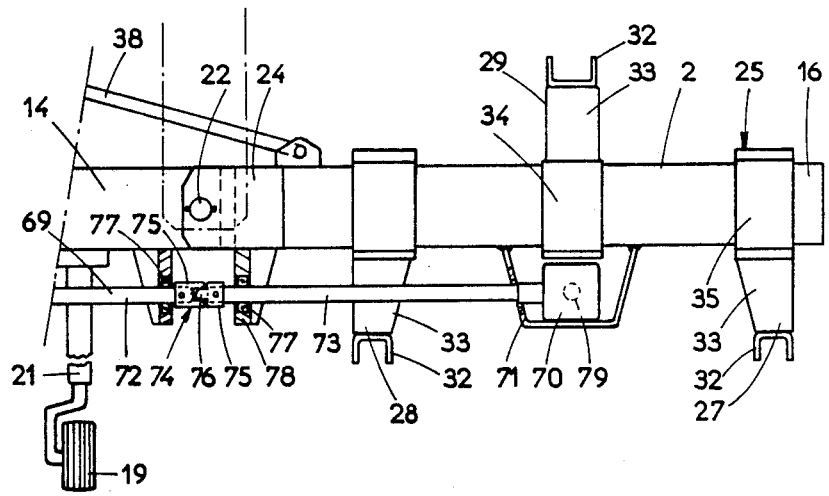
FIG. 5 is a partial front view of the crosswise support of the frame, on a larger scale and in partial section, along arrow V of FIG. 1.
Figure 6:
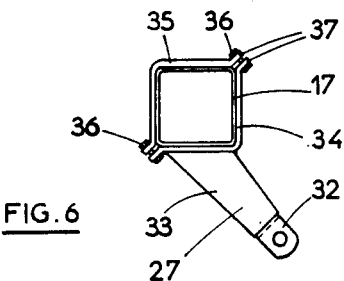
FIG 6 is a detail view of the mode of fastening of the coupling points of the rotors to the crosswise support.

Each of these transmission shafts (69) is made of two parts (72, 73) connected together by a positive clutch (74) (see FIG. 5). For this purpose, each of these parts (72, 73) comprises, at its end turned toward the other part, a tip (75) provided with three teeth (76). During work, teeth (76) of the two tips (75) are located below hinge pins (22 and 23) and mesh to transmit the driving movement. The vertex of these teeth (76) is V shaped, i.e., it comprises two inclined faces. For transport, teeth (76) of the two tips (75) are separated. This separation is automatically produced as a result of the upward pivoting of outside part (73) of each shaft (69) with corresponding lateral part (15 or 16) of crosswise support (2).

It also comes out from FIG. 5 that the two parts (72 and 73) of each transmission shaft (69) are guided in angular contact bearings (77) housed in bearings (78). These bearings (77) are able to resist great axial pressures which can be exerted on the two parts (72 and 73) of each transmission shaft (69) on their return to the work position. For this purpose, these bearings (77) are located on both sides of positive clutches (74). Bearings (78) are respectively fastened to central part (14) and lateral part (15 or 16) of crosswise support (2).

Each transmission housing (70) comprises an output shaft (79) to which is connected a drive shaft (80) which extends in support (47) in the form of a housing of each rotor (30, 31). Inside this support (47), shaft (80) comprises a pinion which meshes with a ring gear integral with hub (40) of corresponding rotor (30, 31) to make the hub turn during work (see FIGS. 1, 2 and 5).

For work, the user can adjust his machine in two different positions as a function of his need. In the position according to FIG. 1, crosswise support (2) is inclined so that, seen in the direction of advance indicated by arrow A, lateral part (15) which carries rotor (31) is more advanced than the other lateral part (16). The angle which crosswise support (2) forms with a straight line perpendicular to direction of advance A is about 40°. This position is obtained by extending cylinder (10) which makes the crosswise support (2) pivot around hinge pin (4) and retraction of cylinders (57) which orient the control cams of toolholding arms (42) and wheel trains (44). In this position, more advanced rotor (31) deposits the raked hay in the action zone of second rotor (30). The latter picks up this hay and deposits it, together with the hay that it has racked, in the shape of a large-volume lateral windrow. Such a windrow is generally formed for gathering the hay by a bailer or a forage harvester.

In the position according to FIG. 2, crosswise support (2) is inclined so that, seen in direction of advance A, lateral part (16) with rotor (30) is more advanced than lateral part (15) with rotor (31). The angle formed by support (2) with a perpendicular straight line in direction of advance (A) is again about 40°. To obtain this position, cylinder (10) has been retracted while cylinders (57) have been extended. In this position, each rotor (30, 31) works independently of the other and makes its own windrow. This position is suitable, for example, to make night windrows or to turn windrows left by a mower or a mower-conditioner to accelerate drying.

According to FIG. 3, the two lateral parts (15 and 16) of crosswise support (2) and rotors (30 and 31) can be raised about 90° around hinge pins (22 and 23). In this position, the width of the machine is reduced. To achieve this position, the two cylinders (38 and 39) have been retracted. In addition, cylinder (10) has been slightly elongated to bring central part (14) of support (2) in a position perpendicular to direction of advance (A). In this position, driving of rotors (30 and 31) is interrupted. The two lateral parts (15 and 16) can optionally be locked mechanically, for example, by means of locks located on central part (14) and able to be connected to lateral parts (15 and 16).

To come back into a work position, the locks are released and cylinders (38 and 39) are operated in the opposite direction. Lateral parts (15 and 16) could also come back downward under the effect of their own weight. During this return, teeth (76) of positive clutches (74) of transmission shafts (69) are automatically put back into place so that they can again transmit the drive movement toward rotors (30 and 31).

On this machine, the transpositions between the different positions represented in FIGS. 1 to 3 are extremely rapid and simple to perform.

It is quite evident that the invention is not limited to the embodiment as described above and represented in the accompanying drawings. Modifications remain possible, particularly from the viewpoint of the constitution of the various elements or by substitution of technical equivalents without thereby going outside the scope of protection.

What is claimed as new and desired to be secured by letters patent of the U.S. is:

1. A farm machine with a toolholding frame movable in a direction of advance, comprising:
 a crosswise support and a coupling device which are pivotally connected by means of a substantially vertical hinge pin, said crosswire support having means for connecting at least two rotors, each of said rotors having a support pin and being rotationally driven around said support pin to move hay lying on the ground, said crosswise support having first means for both pivoting the crosswise support around said substantially vertical hinge pin and stopping the crosswise support in several positions in which different angles are formed relative to the direction of advance, wherein the crosswise support comprises a central part which is connected to said coupling device and two lateral parts which are pivotally connected to the ends of the central part by means of substantially horizontal hinge pins, each lateral part being provided with a further coupling device for connection to at least one rotor of said at least two rotors, and each lateral part comprising second means for pivoting said lateral part upward around said substantially horizontal hinge pin, wherein said central part comprises a distribution housing, each of said lateral parts having a transmission housing comprising drive means connected to the corresponding rotor and a transmission shaft connected to said distribution housing.

2. Farm machine according to claim 1, wherein the central part of said crosswise support comprises one or more small wheels which move over the ground during work.

3. Farm machine according to claim 1, wherein said further coupling device has three hooking points which comprise means for laterally moving said hooking points.

4. Farm machine according to claim 1, wherein said first pivoting means comprise a double-action cylinder located between said coupling device and said crosswise support to position the crosswise support around said substantially vertical hinge pin.

5. Farm machine according to claim 1, wherein said second means for pivoting each of said lateral parts upward comprise hydraulic cylinders which are operated simultaneously.

6. Farm machine according to claim 1, wherein the support pin of each rotor comprises a control cam and a wheel train, and a double-action hydraulic cylinder which orients said support pin with the control cam and the wheel train.

7. Farm machine according to claim 4 or 6, comprising means for simultaneously operating said cylinder which is located between said coupling device and said crosswise support and said cylinders which orient said support pins of said rotors.

8. Farm machine according to claim 1, wherein said transmission shaft comprises two parts connected together near the horizontal hinge pin between the central part and the corresponding lateral part of the crosswise support, said distribution housing of the central part comprising an input shaft which is directed forward in the direction of advance and to which there is connected a further transmission shaft near the substantially vertical hinge pin, said further transmission shaft being guided in a bearing solid with the coupling device.

9. Farm machine according to claim 8, wherein the two parts of each of said transmission shafts are connected together by a positive clutch.

10. Farm machine according to claim 9, wherein said two parts of each of said transmission shafts comprise tips at their adjacent ends, said tips having three teeth which mesh during work.

11. Farm machine according to claim 10, wherein a vertex of said teeth is V shaped.

12. Farm machine according to claim 11, wherein, in a work position, the teeth are located under the substantially horizontal hinge pin between the central part and the corresponding lateral part of the crosswise support.

13. Farm machine according to claim 9, wherein each of said transmission shafts are guided on both sides of said positive clutches by angular contact ball bearings.

14. Farm machine according to claim 8, wherein said input shaft of the distribution housing of the central part of said crosswise support is connected by a double universal joint to said further transmission shaft.

15. Farm machine according to claim 14, wherein the double universal joint is located under said substantially vertical hinge pin and comprises a crosswise plane of symmetry which is offset toward the rear, relative to a geometric axis of said substantially vertically hinge pin.

16. Farm machine according to claim 14, wherein said further transmission shaft comprises two parts, one of said two parts being slidable.

17. Farm machine according to claim 16, wherein the two parts of said further transmission shaft are guided in a bearing which is solid with said coupling device.

* * * * *